United States Patent
Boxwell et al.

(10) Patent No.: US 11,500,867 B2
(45) Date of Patent: Nov. 15, 2022

(54) IDENTIFICATION OF MULTIPLE FOCI FOR TOPIC SUMMARIES IN A QUESTION ANSWERING SYSTEM

(71) Applicant: International Business Machines Corporation, Armonk, NY (US)

(72) Inventors: Stephen A. Boxwell, Columbus, OH (US); Kyle M. Brake, Dublin, OH (US); Keith G. Frost, Delaware, OH (US); Stanley J. Vernier, Grove City, OH (US)

(73) Assignee: International Business Machines Corporation, Armonk, NY (US)

( * ) Notice: Subject to any disclaimer, the term of this patent is extended or adjusted under 35 U.S.C. 154(b) by 288 days.

(21) Appl. No.: 16/182,877

(22) Filed: Nov. 7, 2018

(65) Prior Publication Data

US 2020/0142991 A1    May 7, 2020

(51) Int. Cl.
G06F 16/2453    (2019.01)
G06F 16/2457    (2019.01)

(52) U.S. Cl.
CPC .. G06F 16/24542 (2019.01); G06F 16/24578 (2019.01)

(58) Field of Classification Search
CPC ......... G06F 16/24542; G06F 16/24578; G06F 16/9535; G06F 16/951; G06F 16/2453
USPC ........................................................ 707/765
See application file for complete search history.

(56) References Cited

U.S. PATENT DOCUMENTS

| | | | |
|---|---|---|---|
| 8,818,795 B1 * | 8/2014 | Cassimatis | G06F 40/30 704/9 |
| 9,378,273 B2 | 6/2016 | Chu-Carroll | |
| 9,514,124 B2 | 12/2016 | Allen | |
| 9,633,006 B2 * | 4/2017 | Ryu | G06F 40/284 |
| 2008/0270331 A1 * | 10/2008 | Taylor | G06N 3/126 706/13 |
| 2013/0262501 A1 * | 10/2013 | Kuchmann-Beauger | G06F 16/9024 707/769 |
| 2014/0149446 A1 * | 5/2014 | Kuchmann-Beauger | G06F 16/248 707/763 |
| 2014/0280114 A1 * | 9/2014 | Keysar | G06F 16/9535 707/730 |
| 2014/0280307 A1 * | 9/2014 | Gupta | G06N 5/025 707/769 |
| 2014/0358890 A1 * | 12/2014 | Chen | G06F 16/3329 707/710 |

(Continued)

OTHER PUBLICATIONS

M.C. McCord, Deep parsing in Watson, IBM Journal of Research & Development, vol. 56 No. 3/4 Paper 3 May/Jul. 2012, pp. 1-15.

(Continued)

*Primary Examiner* — Hosain T Alam
*Assistant Examiner* — Nicholas E Allen
(74) *Attorney, Agent, or Firm* — Brian Welle; Otterstedt & Kammer PLLC (57) ABSTRACT

A method of augmenting an information retrieval method including receiving a query, parsing the query to generate an instance graph, providing a plurality of constraint graphs, organized into at least two ranks, each constraint graph associated with a focus, determining at least one of the constraint graphs matching a structure of the instance graph, and annotating the query with the focus of each matching constraint graph of a highest rank among all matching constraint graphs.

14 Claims, 5 Drawing Sheets

(56) References Cited

U.S. PATENT DOCUMENTS

| | | | |
|---|---|---|---|
| 2015/0199436 A1* | 7/2015 | Bailey | G06F 7/36 707/708 |
| 2015/0227589 A1* | 8/2015 | Chakrabarti | G06F 16/24564 707/748 |
| 2015/0331935 A1* | 11/2015 | Jamrog | G06F 16/2425 707/722 |
| 2015/0363461 A1* | 12/2015 | Behal | G06F 16/24534 707/722 |
| 2016/0239562 A1* | 8/2016 | Schilder | G06F 16/3329 |
| 2016/0239740 A1* | 8/2016 | Baughman | G06N 20/00 |
| 2016/0240095 A1* | 8/2016 | Baughman | G06F 16/3344 |
| 2016/0306846 A1* | 10/2016 | Adams, Jr. | G06N 5/02 |
| 2016/0342628 A1* | 11/2016 | Van Rest | G06F 16/832 |
| 2016/0378851 A1* | 12/2016 | Merdivan | G06F 16/3344 707/722 |
| 2017/0024461 A1* | 1/2017 | Mac an tSaoir | G06F 16/334 |
| 2017/0068903 A1* | 3/2017 | Hakkani-Tur | G06N 5/022 |
| 2017/0132522 A1* | 5/2017 | Junker | G06Q 30/0207 |
| 2017/0139991 A1* | 5/2017 | Teletia | G06F 16/9024 |
| 2017/0169094 A1 | 6/2017 | Gibson | |
| 2017/0243107 A1* | 8/2017 | Jolley | G06N 5/02 |
| 2017/0270120 A1* | 9/2017 | Ajmera | G06F 16/3338 |
| 2017/0308620 A1* | 10/2017 | Cao | G06F 16/24542 |
| 2018/0107647 A1* | 4/2018 | Ackermann | G06F 16/90332 |
| 2018/0107648 A1* | 4/2018 | Ackermann | G06F 40/295 |

OTHER PUBLICATIONS

A. Lally, Question analysis: How Watson reads a clue, IBM Journal of Research & Development, vol. 56 No. 3/4 PAPER 2 May/Jul. 2012, pp. 1-14.

IBM, A System & Method to Identify Correct Candidates for Question Answering over Structured Knowledge, IP.com No. IPCOM000180748D, Mar. 16, 2009, pp. 1-4.

Anonymous, Technique for personalized question answering by orchestrating different system using corpus relevancy, IP.com No. IPCOM000239698D, Nov. 26, 2014, pp. 1-4.

Daniel Jurafsky, Chapter 28, Question Answering, Speech and Language Processing, Aug. 7, 2017, pp. 1-19.

Mohnish Dubey, EARL: Joint Entity and Relation Linking for Question Answering over Knowledge Graphs, International Semantic Web Conference 2018, Jan. 11, 2018, pp. 1-15.

Ricardo Usbeck, Benchmarking Question Answering Systems, Semantic Web 1 (2016) 1-5, Feb. 24, 2017, pp. 1-11.

\* cited by examiner

<How many soldiers fought for their country in Europe in World War II in what years?>

400

401

=== Links ===
node10 objprep
node12
node2 subj node1
node5 nprep node6
node2 comp node3
node5 ndet node4
node6 objprep node7
node8 objprep node9
node2 vprep node10
node12 ndet node11
node1 ndet node0
node2 vprep node8
node3 objprep node5

=== Features ===
node11 whnom true
node10 text in
node2 vpast true
node9 isTop false
node1 text soldier
node3 pprefv true
node12 cn true
node3 isTop false
node7 capped true
node11 pl true
node9 capped true
node11 text what
node2 vsubj true
node6 isTop false
node1 isTop false
node2 wh true
node12 text year
node0 wh true
node11 isTop false
node12 isTop false
node0 isTop false
node8 prep true
node0 text howmanyhowmuch
node4 det true
node6 text in
node6 staticp true
node3 text for
node7 noun true
node9 sg true
node5 cn true
node12 pl true
node9 evnt true
node12 wh true
node5 sg true
node10 wh true
node2 pl true
node7 text Europe
node7 sg true
node10 isTop false
node7 propn true
node10 staticp true
node2 text fight
node12 tm true node2 vfin true
node11 det true
node4 text their
node12 advnoun true
node4 sg true
node10 timepp true
node5 noun true
node8 text in
node4 isTop false
node1 anim true
node2 isTop true
node8 isTop false
node11 text whatwhich
node3 prep true
node12 whnom true
node1 h true
node2 verb true
node1 wh true
node1 cn true
node5 isTop false
node1 pl true
node0 pl true
node9 propn true
node4 possdet true
node4 ingdet true
node12 noun true
node6 prep true
node9 text World War II
node3 nonlocp true
node3 pobjp true
node5 text country
node5 geoarea true
node9 tmperiod true
node1 noun true
node11 text whowhat
node9 noun true
node11 wh true
node7 isTop false
node8 staticp true
node2 sg true
node0 det true
node10 prep true
node0 text how many

IDENTIFICATION OF MULTIPLE FOCI FOR TOPIC SUMMARIES IN A QUESTION ANSWERING SYSTEM

BACKGROUND

The present disclosure relates generally to question answering (QA) systems, and more particularly to the identification of multiple foci for topic summaries.

In the context of QA systems, users sometimes want to obtain a general summary of entities that are in some kind of relation. For example, a user may ask: "What assassins are associated with politicians in the United States?" This query corresponds to a complex database query, identifying entities in a relationship. However, a database with this data might not be available, or the user might be inexperienced in database query languages and prefer to pose their question in natural language. A conventional factoid QA system is insufficient to answer this question, at least because the QA system's focus on a single entity would not sufficiently answer the question, leaving unanswered whether "Joe Smith" is the assassin or the politician, or even who the other individual in the relationship was.

SUMMARY

A method of augmenting an information retrieval method including receiving a query, parsing the query to generate an instance graph, providing a plurality of constraint graphs, organized into at least two ranks, each constraint graph associated with a focus, determining at least one of the constraint graphs matching a structure of the instance graph, and annotating the query with the focus of each matching constraint graph of a highest rank among all matching constraint graphs.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments may provide for:

enabling a question answering system to handle (and users to provide) a new type of query;

the identification of multiple foci in the query; and annotation of the query (or its representation) identifying the foci for processing by the question answering system, where a properly annotated query is processed by the question answering system with improved results (e.g., providing pairs or answer in the case of a query with two foci).

These and other features and advantages of the present invention will become apparent from the following detailed description of illustrative embodiments thereof, which is to be read in connection with the accompanying drawings.

BRIEF DESCRIPTION OF THE DRAWINGS

Preferred embodiments of the present invention will be described below in more detail, with reference to the accompanying drawings:

FIG. 4 is an instance graph according to an exemplary embodiment of the present invention.

DETAILED DESCRIPTION

Embodiments of the present invention are directed an augmented question answering (QA) system that takes a complex database query and identifies one or more foci of the query, and in particular is configured to identify multiple foci. For example, in the question "What assassins are associated with politicians in the United States?", the two foci are identified as "what assassins" and "what politicians." According to at least one exemplary embodiment of the present invention, the QA system includes a natural language processor configured to process the query to determine the multiple foci of the query.

Embodiments of the present invention are directed to the non-conventional identification of multiple foci in a query, with downstream components configured to handle more than one foci. Typical question answering systems assume the existence of only one focus. Exemplary downstream components (i.e., downstream from the detection of foci) include answer scoring systems, which determine a degree to which evidence confirms or rejects candidate answers, and merging systems that use the output of the answer scoring systems to rank the candidate answers and estimate a confidence indicating a likelihood that each candidate answer is correct.

According to one or more embodiments of the present invention, the focus (or foci) is the part of the query that is a reference to the answer. In the example above, the foci are "what assassins" and "what politicians." In some embodiments, the query is annotated to identify the foci and the annotated query is processed to return results likely to answer the query. Embodiments of the present invention enable the QA system to return improved results, e.g., with more relevant answers, with higher confidence answers, broader answers, answers including multiple pieces of information corresponding to each identified focus (e.g., each candidate answer can include a pair of answers in the case of two foci, where one answer of the pair corresponds to a first focus and a second answer of the pair corresponds to the second focus), etc.

In some embodiments, a QA system engine as referenced herein comprises software components such as, but not limited to, computer-executable instructions, data access objects, service components, user interface components, application programming interface (API) components; hardware components such as electrical circuitry, processors, and memory; and/or a combination thereof. The memory may be volatile memory or non-volatile memory that stores data and computer executable instructions. The computer-executable instructions may be in any form including, but not limited to, machine code, assembly code, and high-level programming code written in any programming language. The QA system may be configured to use the data to execute one or more instructions to perform one or more tasks.

In some embodiments the QA system includes a processor, a user interface connected to the processor, and a corpus of data stored in appropriate computer-readable medium accessible to the processor. A query is received by the QA system through the user interface. The QA system parses the query, generating an instance tree by identifying features or properties of individual nodes or tokens, and edges or links between the nodes or tokens. According to an exemplary embodiment of the present invention, a parsed query is analyzed to identify the foci of the query. The foci of the query can be used to process the query using various methods, for example, in identifying and replacing one or more referring phrases in the query to add context to the query (e.g., generated a reformulated query), etc. According to some embodiments, the QA system searches the corpus of data and creates a collection of candidate answers to the reformulated query, possibly including contextual information, from the corpus of data. According to some embodiments, each candidate answer is associated with supporting evidence and a confidence score generated by the QA system. Some embodiments of the present invention include identifying an answer for each identified focus and providing these answers in a single candidate answer. It should be understood that the method of finding candidate answers is exemplary and is not intended to be limiting.

In some embodiments, the QA system receives a query and generates a graph representing the query, hereinafter, an instance graph. In at least one embodiment, the QA system uses an existing parsing tool, such as the English Slot Grammar (ESG) parser, to generate the instance graph.

In the exemplary case of the ESG parser, a query is parsed into an instance graph or tree, including nodes and edges, that shows surface structure and deep logical structure. Each node of the instance graph is associated with: 1) a word or a phrase with an associated predicate and its logical arguments; 2) syntactic features and/or semantic features; and 3) modifiers of the node (e.g., left modifiers such as determiners, quantifiers, adjectives, and nouns, and right modifiers such as prepositional phrases and apposition), each modifier with the slot it fills (in the context of natural language processing, described in detailed herein).

An instance graph is generated for the query that includes a surface-level for grammatical structure and a level of logical analysis of the query, and shows for each phrase (or node in the instance graph), the slot filled by the phrase. The ESG uses slots to represent syntactic relations within a sentence or fragment of a sentence. In some exemplary embodiments the QA system simplifies the instance graph, for example, using the predicate-argument structure (PAS) builder top process the parse tree and remove or transform certain details from the instance graph.

In the context of the ESG parser, the slots represent the syntactic roles of the words or phrases in a sentence. The syntactic roles can include, for example, "ndet" for determiner relationships such as "the," "my" and "this," "adjpre" for modifiers of adjectives, and "mod_whadv" for certain verb adjuncts (e.g., "when"). One of ordinary skill in the art would understand that other syntactic roles exist.

It should be understood that the instance graph can take a variety of forms. For example, an instance graph includes features or properties of individual nodes or tokens, and edges or links between the nodes or tokens. Using the example query "How many soldiers fought for their country in Europe in World War II in what years?" 401, an instance graph 400 may be written as shown in FIG. 4.

According to some embodiments of the present invention, the annotated query points to the foci identified by listing the token indexes. In the example "How many soldiers fought for their country in Europe in World War II in what years?", the focus annotation includes a list [0,12], where "How many" and "World War II" are each counted as single tokens (i.e., node0 402 and node 9 403 in the instance graph 400 shown in FIG. 4). In some embodiments, the focus annotation provides an indication of which token (e.g., word or phrase) in the query corresponds to which focus, where the token points back to the syntactic representation of the query.

According to an embodiment of the present invention, a plurality of constraint graph patterns is used by the QA system to match on foci in a query and more particularly to match the constraint graph patterns to portions of the instance graph representing the query.

In one or more exemplary embodiments, the constraint graph patterns are organized into a well-partial-ordered (WPO) hierarchy. In some embodiments, the constraint graph patterns are organized into groups, with each group representing a rank in the hierarchy.

In some embodiments a constraint graph is a subtree that represents a pattern that might appear in a query or an instance graph representation of the query. If a constraint graph subtree is determined to be part of the candidate query tree, i.e., the instance graph, then the constraint graph fires and a candidate for a focus is determined. Accordingly, in one or more embodiments of the present invention the QA system compares each of the constraint graph patterns to the instance graph.

Figure 1:
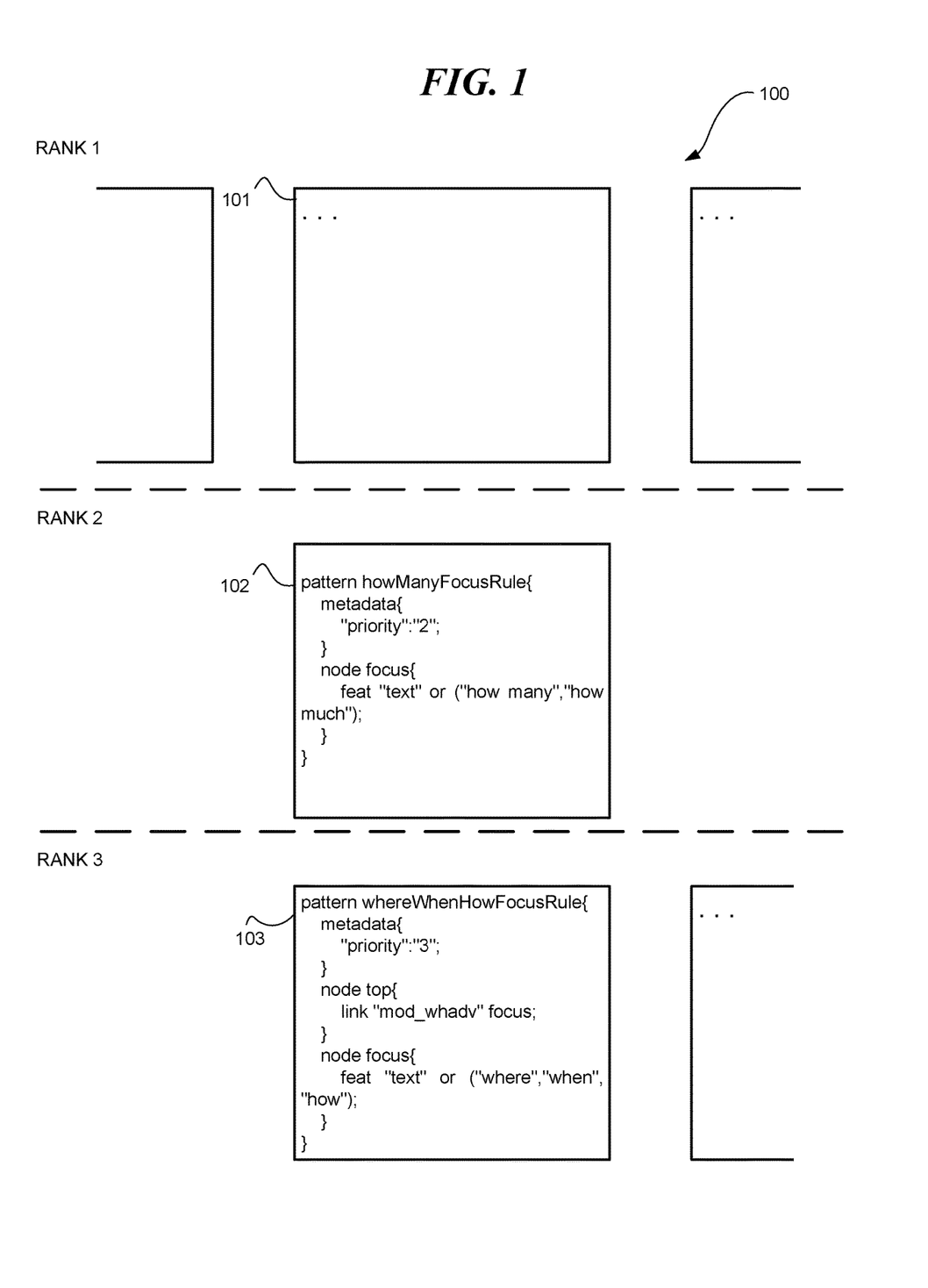
FIG. 1 is a diagram of graph patterns organized into ranks according to an exemplary embodiment of the present invention.

According to an exemplary embodiment of the present invention, in a WPO hierarchy all the constraint graphs are ranked (e.g., from 1 to n), and some of the graphs can be of the same rank. If two graphs fire and they have the same rank, then they both are accepted. In some embodiments, if two graphs fire and they have different ranks, only the higher rank graph is accepted. FIG. 1 is an example of a WPO hierarchy 100 including a plurality of graphs e.g., 101, where a first graph 102 (howManyFocusRule) is higher ranked than a second graph 103 (whereWhenHowFocusRule). It should be understood that the WPO hierarchy 100 can include different numbers of graphs at each rank. For example, as shown in FIG. 1, rank 1 includes at least three graphs, rank 2 includes one graph and rank 3 includes at least two graphs.

According to at least one embodiment of the present invention and using constraint graph 102 as an example, a constraint graph includes a name (e.g., "howManyFocusRule") and metadata giving a rank or priority (e.g., "2"). The constraint graph further includes a feature (feat) to search, such as "text" together with a string to be searched for (e.g., "how many" or "how much").

It should be understood that different embodiments of the constraint graphs can be used, for example, with similar frameworks and hierarchy structures, and that one of ordinary skill in the art would appreciate that exemplary constraint graphs provided herein are not limiting. Furthermore, in some embodiments the constraint graphs can be used to identify foci in a question answering system with just single foci (e.g., "Who shot JFK?" or "Where did Neil Armstrong and Buzz Aldrin travel to?").

Figure 2:
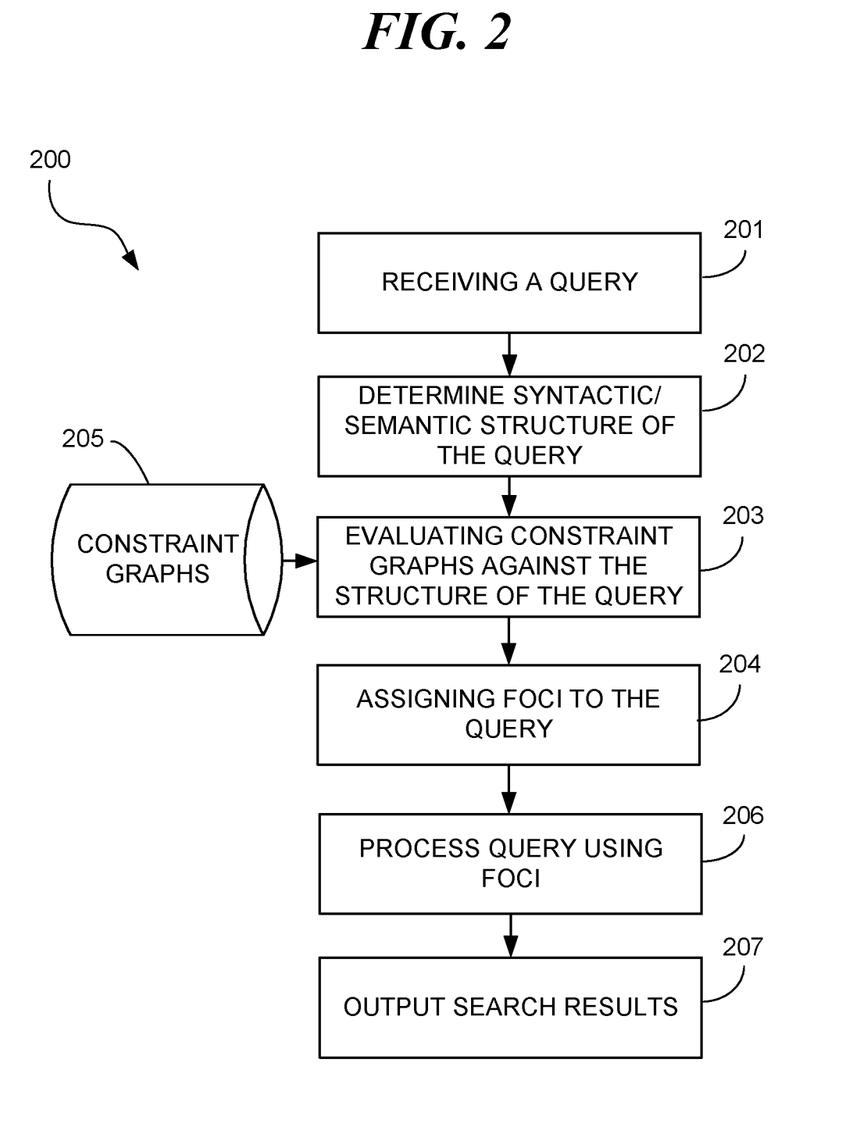
FIG. 2 is a flow diagram of method of an information retrieval method identifying more than one focus according to an exemplary embodiment of the present invention.

Referring to FIG. 2, the QA system receives a query 201, a graph representing a syntactic/semantic structure of the query is generated 202, constraint graphs are provided 205 and are evaluated against the graph representing the syntactic/semantic structure of the query 203, either all-at-once or in batches based on rank. The matching graphs of the highest-rank constraint graph group to contain at least one matching constraint graph are used to assign foci to the queries 204.

In some embodiments, the query is processed using the multiple foci 206 to output search results 207.

In some embodiments, at 202, the syntactic/semantic representation uses a syntactic/semantic parser such as the ESG parser. It should be understood that any appropriate dependency parser can be used. Other examples include the Clark and Curran parser (for the CCG framework) and the MALT parser.

In some embodiment, the evaluation of the constraint graphs against the graph representing the syntactic/semantic structure of the query includes a check to determine which of the constraint graphs match the graph that represents the question. The method proceeds with the highest ranking matching graph (or graphs).

According to one or more exemplary embodiments of the present invention, the all-at-once and batch based evaluations may exhibit performance differences. The end result should be the same. In some embodiments, an all-at-once evaluation is faster than a batch based evaluation when the graph matching tool re-uses certain internal calculations.

In some embodiments, at 204, foci from more than one higher level ranks are used, e.g., using foci from the top two ranks. It should be understood that a different number of ranks can be used based on the application, and that examples provided herein are not limiting.

Figure 3:
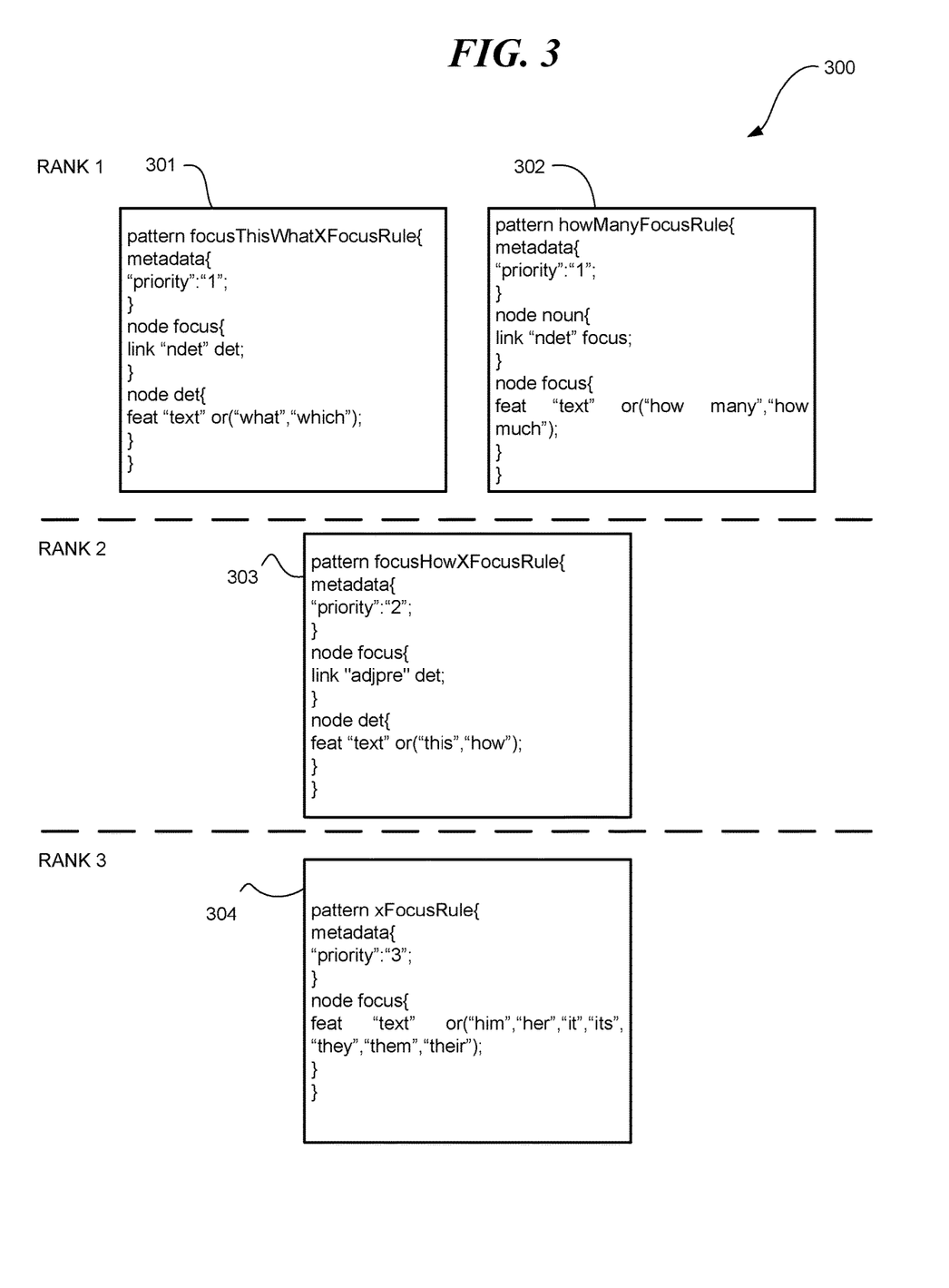
FIG. 3 is a diagram of graph patterns organized into ranks according to an exemplary embodiment of the present invention.

In the following simple example, consider four graph patterns organized into three ranks as shown in FIG. 3.

For purposes of describing an example embodiment, consider the four graph patterns of FIG. 3 are processed on the query "How many soldiers fought for their country in Europe in World War II in what years?" Given a correct syntactic analysis of the query, three of the graph patterns will fire: focusThisWhatXFocusRule 301, howManyFocusRule 302, and xFocusRule 304. More particularly, the graph pattern focusThisWhatXFocusRule 301 matches to "what" in an instance graph representing the query, the graph pattern howManyFocusRule 302 matches to "many" in the instance graph representing the query, and the graph pattern xFocusRule 304 matches to "their" in the instance graph. The graph pattern focusHowXFFocusRule 303 will not fire. Consider the well-partial ordering of the rules depicted in FIG. 3; by observing their hierarchical relations to one another, only rank 1 patterns, including focusThisWhatXFocusRule 301 and howManyFocusRule 302, will be used to annotate foci (tokens "World War II" and "How many," respectively) in a syntactic representation of the query. According to some embodiments, the annotation suggested by the xFocusRule pattern 304, which would annotate "their" in the query as a focus, is ignored since it has a lower rank, i.e., rank 3.

Consider a different query, one phrased as an answer to prompt a question: "He landed on the moon with him." Although this is not strictly a question, the intention of the query is likely clear to one literate in the English language. The query concerns pairs of people who landed on the moon together (e.g., Neil Armstrong and Buzz Aldrin). In this case, the rank 1 and rank 2 graph patterns do not fire. The xFocusRule pattern 304, however, does fire. In this case, no higher-rank graph patterns fired, therefore the words "he" and "him" are annotated in a syntactic representation of the query as foci. Unlike in the previous example, the xFocusRule predictions are not ignored, because there were no higher-rank pattern groups that fired, and the xFocusRule pattern 304 is used to annotate the syntactic representation of the query.

According to an embodiment of the present invention, augmented question answering (QA) system is configured to determine no (zero) foci. For example, in a case where the system receives the input "Paris is the capital of France.", the system determines no foci relevant to a question. According to one or more embodiments of the present invention, the system continues to process the input by, for example, confirming or rejecting the statement by looking for statements that match the input. Given the exemplary input above, the focus determining system identifies one or more passages that confirm or reject the input, such as, "France's capital is Paris.", which confirms the input. According to an exemplary embodiment of the present invention, the general case of finding foci is configurable to handle the case where there a no foci.

Recapitulation

According to one or more embodiments of the present invention, a method of augmenting an information retrieval method comprises receiving a query 201, parsing the query to generate an instance graph 202, providing a plurality of constraint graphs, organized into at least two ranks, each constraint graph associated with a focus 205, determining at least one of the constraint graphs matching a structure of the instance graph 203 and annotating the query with the focus of each matching constraint graph of a highest rank among all matching constraint graphs 204. Some embodiments include passing an annotated query comprising indications of the foci to a downstream component of a question answering system 206, wherein the question answering system is configured to return a result based on the annotated query 207.

The methodologies of embodiments of the disclosure may be particularly well-suited for use in an electronic device or alternative system. Accordingly, embodiments of the present invention may take the form of an entirely hardware embodiment or an embodiment combining software and hardware aspects that may all generally be referred to herein as a "processor," "circuit," "module" or "system."

Furthermore, it should be noted that any of the methods described herein can include an additional step of providing a computer system for an augmented QA system configured to identify more than one focus. Further, a computer program product can include a tangible computer-readable recordable storage medium with code adapted to be executed to carry out one or more method steps described herein, including the provision of the system with the distinct software modules.

Figure 5:
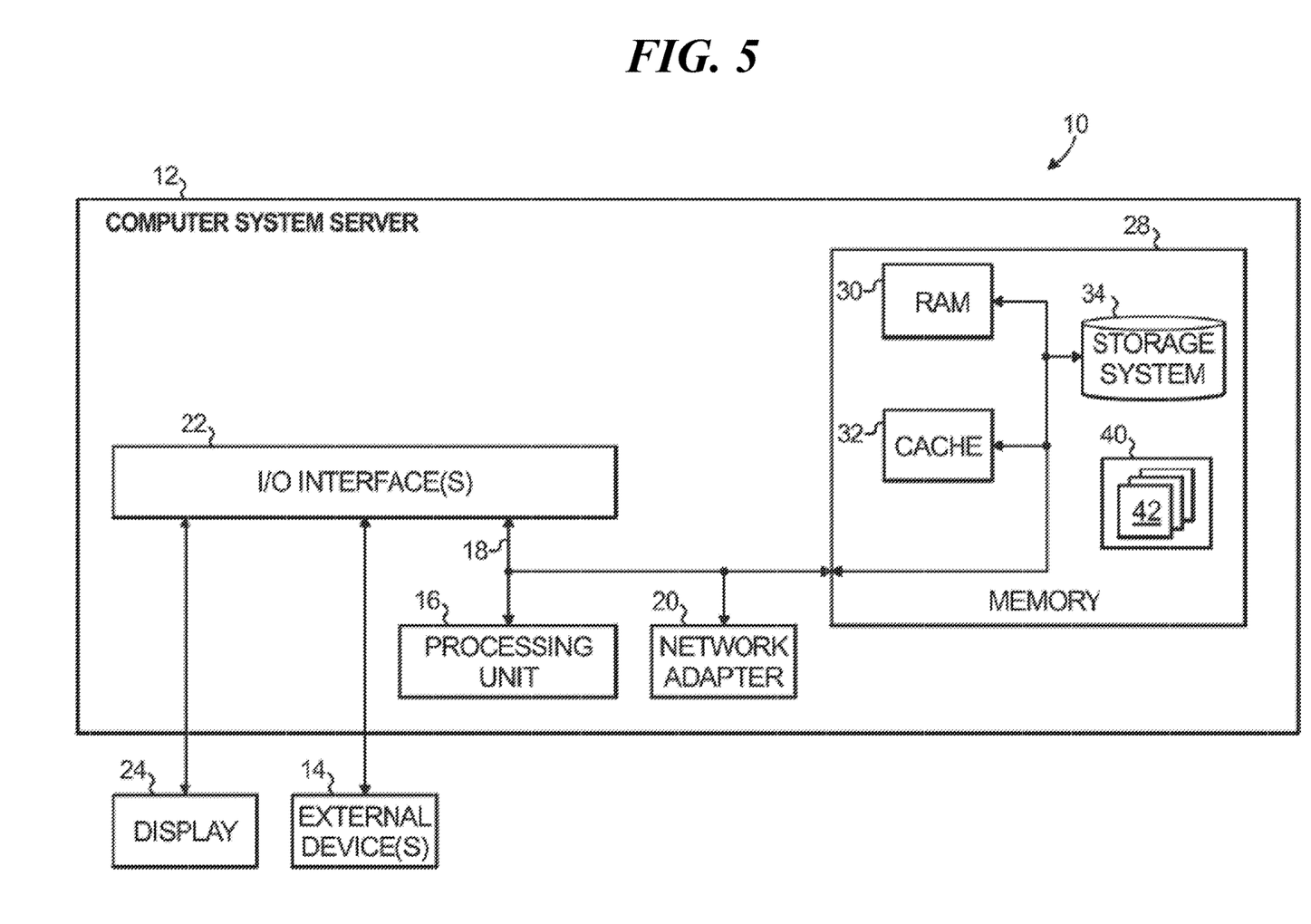
FIG. 5 is a block diagram depicting an exemplary computer system embodying a method for identifying more than one focus in a query according to an exemplary embodiment of the present invention.

One or more embodiments of the invention, or elements thereof, can be implemented in the form of an apparatus including a memory and at least one processor that is coupled to the memory and operative to perform exemplary method steps. FIG. 5 depicts a computer system that may be useful in implementing one or more aspects and/or elements of the invention, also representative of a cloud computing node according to an embodiment of the present invention. Referring now to FIG. 5, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 5, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 5) running a server program. It will be understood that such a physical server may or may not include a display and keyboard.

One or more embodiments can be at least partially implemented in the context of a cloud or virtual machine environment, although this is exemplary and non-limiting.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of augmenting an information retrieval method comprising:
   receiving, by a question answering system, a query;
   parsing, by the question answering system, the query to generate an instance graph comprising a structure of nodes and links between the nodes;
   determining, by the question answering system, at least two of a plurality of constraint graphs matching on respective portions of the structure of the instance graph, wherein the plurality of constraint graphs is organized into at least two ranks of a hierarchy, and each constraint graph is associated with a focus, which is a potential focus of the query;
   annotating, by the question answering system, the query to include an indication of the focus of each of the respective portions matching on the at least two constraint graphs of a highest rank among all matching constraint graphs; and
   passing, by the question answering system, an annotated query comprising the indications of the focus of each of the respective portions matching on the at least two constraint graphs to a downstream component of the question answering system configured to return a plurality of answers including a respective answer corresponding to each of the respective foci of the annotated query.

2. The method of claim 1, wherein parsing the query to generate the instance graph comprises determining a syntactic structure of the query.

3. The method of claim 1, wherein parsing the query to generate the instance graph comprises determining a semantic structure of the query.

4. The method of claim 1, wherein the question answering system is configured to return a result based on the annotated query including the indications of the focus of each of the respective portions matching on the at least two constraint graphs.

5. The method of claim 1, further comprising ignoring at least a third one of the constraint graphs matching a third portion of the structure of the instance graph and having a rank lower than the constraint graphs of the highest rank among all matching constraint graphs.

6. The method of claim 1, wherein the indications of the focus of each of the respective portions matching on the at least two constraint graphs are each an annotation of the instance graph made upon evaluating graph patterns contained in each of a set of the plurality of constraint graphs of the highest rank against the instance graph.

7. The method of claim 1, further comprising providing the plurality of constraint graphs by providing access to the plurality of constraint graphs stored in a computer-readable medium, wherein each of the plurality of constraint graphs includes a pattern name and metadata describing a structure to be matched to the instance graph, the structure to be matched includes a feature text associated with a respective one of the nodes of the instance graph.

8. The method of claim 7, wherein the portion of the structure matched includes one or more of the links between respective ones of the nodes of the instance graph.

9. The method of claim 1, further comprising providing a non-transitory computer readable medium comprising computer executable instructions which when executed by a computer cause the computer to perform the method of augmenting the information retrieval method.

10. In a general purpose computer, a method for operating an augmented question answering system configured to identify more than one focus, the method comprising:
   receiving a natural language query;
   parsing the natural language query to generate an instance graph comprising a structure of nodes and links between the nodes;
   determining a plurality of the constraint graphs matching on respective portions of the structure of the instance graph, wherein each constraint graph of the plurality of constraint graphs has a rank in a hierarchy and is associated with a respective focus;
   generating an annotated query by annotating the query to include an indication of the respective focus of the plurality of constraint graphs of one or more high ranks in the hierarchy matching on the respective portions of the structure of the instance graph and ignoring at least one of the plurality of constraint graphs matching the structure of the instance graph and having a rank lower in the hierarchy than the plurality of constraint graphs of the one or more high ranks; and
   passing the annotated query to a downstream component of the question answering system configured to return a plurality of answers including a respective answer corresponding to each of the respective foci of the annotated query.

11. The method of claim 10, wherein parsing the query to generate the instance graph comprises determining at least one of a syntactic structure of the query and a semantic structure of the query.

12. The method of claim 10, further comprising passing an annotated query comprising the indications of the foci to a downstream component of a question answering system, wherein the question answering system is configured to return a result based on the annotated query.

13. The method of claim 10, further comprising providing access to the plurality of constraint graphs stored in a computer-readable medium, wherein each of the plurality of constraint graphs includes a pattern name and metadata describing a structure to be matched to the instance graph, the structure to be matched includes a feature text associated with a respective one of the nodes of the instance graph.

14. The method of claim 13, wherein the portion of the structure matched includes one or more of the links between respective ones of the nodes of the instance graph.

\* \* \* \* \*